United States Patent Office 3,301,904
Patented Jan. 31, 1967

3,301,904
PURIFICATION OF META NITRO PARA TOLUIDINE
John Cryer, New Lenox, Ill., assignor to The Sherwin-Williams Company, Cleveland, Ohio, a corporation of Ohio
No Drawing. Filed Oct. 11, 1963, Ser. No. 315,662
14 Claims. (Cl. 260—582)

This invention relates to an improvement in a process for the manufacture of meta nitro para toluidine by ammonolysis of meta nitro para cresol, and particularly to a novel method for purifying the crude meta nitro para toluidine produced by ammonolysis of meta nitro para cresol.

It is well known that meta nitro para toluidine (MNPT) can be produced by ammonolysis of meta nitro para cresol (MNPC). Specifically Cryer, U.S. 2,894,988 and Cryer and Burk U.S. 2,970,171 disclose processes for production of MNPT comprising subjecting one molar proportion of MNPC, at least about one mole of ammonium chloride (more than merely a catalytic amount) and at least 6 moles of ammonia in an aqueous environment wherein the molar ratio of ammonia to water is at least of greater numerical value than 1:2, in an autoclave passivated against metal ion donation under the conditions of the processing, to the autogenous pressures which develop in the autoclave at temperatures above 125° C., but usually not exceeding 150° C. and preferably less than 145° C. for from about 6 to 40 hours, or a time sufficient to complete substantially the ammonolysis of said MNPC. Such treatment, however, yields only a crude MNPT, the product being contaminated with unreacted starting material (usually 1.5% to 4.0% by weight MNPC) and degradation products. The purification processes taught by the prior art involve recrystallization from toluene. The toluene recrystallization method of purification is unsatisfactory for a number of reasons. Such process is slow, cumbersome, hazardous, and involves numerous manipulative steps, many of which must be carried out by hand. In addition, the toluene recrystallization is a costly method of purifying the crude MNPT.

It is, therefore, an object of the present invention to provide a simple, quick and efficient process for the purification of crude MNPT.

It is another object of the present invention to provide a process for the purification of MNPT wherein unreacted starting material is recoverable.

Another object is to provide an improved process for purifying MNPT which is less costly than methods heretofore known.

A further object is to provide a process for the purification of MNPT which yields a finished product of a higher quality than that produced by methods heretofore known.

These and other objects and advantages of the present invention will be apparent from a reading of the following description.

In brief, the present invention involves pretreatment of the crude MNPT containing MNPC to convert the MNPC to a water soluble salt, separating the water soluble salt of MNPC from the MNPT, and contacting the residual MNPT in molten form with a particulate solid adsorbent until substantially all the remaining impurities are removed. The adsorbent is then separated from the molten MNPT by suitable means, for example, by filtration, and the filtrate consisting essentially of molten MNPT is recovered. Upon cooling below the melting point (118° C.) the solid form is produced. An increased yield is obtained if the MNPT occluded in the solid adsorbent is also recovered.

The pretreatment involves contacting the crude MNPT, in liquid phase, with dilute aqueous alkali solution (e.g., NaOH, KOH, $Na_2CO_3$, $NaHCO_3$ dissolved in water) under conditions such that the MNPT is not substantially hydrolyzed. Under conditions of vigorous mixing, the MNPC, present as an impurity, is converted to its water soluble alkali metal salt, most of which dissolves in the aqueous phase.

It is preferred that the aqueous alkali pretreating solution be approximately 0.04% to 2% alkali, calculated as NaOH. It is preferred also that the alkali metal roughly be in two-fold excess of the quantity needed to be stoichiometrically equivalent to the MNPC present in the crude MNPT. However, the concentration of alkali should be insufficient to cause hydrolysis of the MNPT under the conditions used. If the alkali concentration is too great, MNPT will be hydrolyzed back to free cresol and ammonia.

The dilute aqueous caustic wash must be carried out at a temperature in excess of the melting point of MNPT, but less than the temperature at which substantial decomposition of MNPT occurs. Above about 150° C. the danger of thermal degradation of the MNPT develops. Preferably, the washing is carried out at a temperature in excess of about 120° C., but not greater than about 130° C.

The length of time during which the pretreatment with dilute aqueous alkali solution is carried out is not critical and may vary from a few minutes to a few hours. Preferably, the mixture is agitated for about 10 to 20 minutes, or until substantially all the MNPC has been converted into its water soluble alkali salt. After the agitation is completed, the mixture is allowed to separate, and the liquid MNPT is drawn off from the aqueous washing phase. Due to the partial solubility of the aqueous layer in the oil layer, there is no simple straightforward separation of the aqueous phase. Instead, the alkali treatment results only in a reduction of the amount of MNPC in the crude MNPT oil.

Various modifications of the pretreatment are possible so that the last traces of MNPC are removed following the initial aqueous alkali solution washing. According to one modification, substantially all of the MNPC is eliminated from the oil by subjecting the molten MNPT to a series of successive washings with dilute aqueous alkali solution. If efficient agitation means are employed, the number of alkali washes may be reduced to as low as two.

Rather than using successive alkali washes, water alone may be used after the initial treatment with an alkali solution to eliminate the last traces of MNPC from the crude oil. According to a preferred modification, the liquid MNPT is first washed with dilute alkali solution as previously described, preferably an aqueous solution of sodium hydroxide. The oil layer is separated from the aqueous phase and the former is blown out through a spray jet into water with resultant agitation. The resulting slurry is then heated with agitation to a temperature above the melting point of MNPT (118° C.), but less than 150° C., preferably to about 120° C. to 130° C. The oil layer is again separated and sprayed into water. Filtration of this second slurry gives MNPT which is free of MNPC.

Typically, the oil layer is separated from the aqueous phase by merely drawing off the heavier liquid MNPT. According to another preferred modification of the washing procedure, however, at the end of the alkali wash, instead of drawing off the MNPT as an oil, the oil and the aqueous phase are slowly cooled with agitation to a temperature of about 90° C. The aqueous liquor is then decanted from the finely divided granulated solid, and the residual solid washed with cold water to a pH of about 7. The solid MNPT is then collected by filtration.

Some MNPT will always remain in the aqueous alkali washing liquors because of its slight solubility therein. This loss can be minimized by utilizing the same alkali and aqueous washing solutions for a series of charges of crude MNPT. With the charges of crude subsequent to the first, there will be no loss of MNPT due to solubility in water, since the wash solutions will then be saturated with respect to MNPT.

The unreacted MNPC starting material can be recovered by acidifying the caustic and aqueous wash solutions with mineral acid (e.g., hydrochloric, sulfuric, sulfurous, nitric and phosphoric), and filtering the resultant slurry. The pH is usually around 1 to 2. The MNPC so recovered can be recycled and used in the production of MNPT. Since MNPC is a fairly strong acid, it is necessary to use an acid in this step of the process having a dissociation constant higher than that of MNPC.

After pretreatment, as previously, described, the MNPT crude is contacted in dry melt form with a particulate solid adsorbent to give purified MNPT, which is subsequently recovered from the adsorbent by any suitable means.

Where the crude is pretreated with dilute alkali solution so as to render the crude substantially MNPC free, one melt-adsorption treatment is sufficient to complete the purification.

Broadly, the melt adsorption treatment involves contacting a dry (i.e. essentially anhydrous) MNPT melt with a particulate solid adsorbent, separation of the melt from the adsorbent, and recovery of the purified MNPT in solid form.

Specifically, the dry liquid MNPT is contacted with a particulate solid adsorbent at a temperature greater than the melting point of MNPT, but below the temperature at which substantial decomposition of MNPT occurs, preferably at a temperature from about 120° C. to about 130° C., for a time sufficient to obtain good contact between the MNPT melt and the particulate solid adsorbent. Preferably, the MNPT melt and the adsorbent are contacted for about 15 to 45 minutes. After the MNPT melt has contacted the adsorbent, the purified MNPT is recovered by filtration or other suitable means.

Filtration of the MNPT melt can be facilitated by gas under pressure, or by heated pump means. Pressures of 15–30 p.s.i. are usually sufficient. In addition, the rate of filtration can be improved if the filter is pre-coated with filter aids such as, for example, diatomaceous silica and asbestos. Examples of suitable filter aids are given in Industrial and Engineering Chemistry, vol. 34, page 405, April 1942.

Substantially any particulate solid adsorbent can be used which is effective in non-aqueous liquids, the amount necessary to effect purification being dependent upon the adsorption characteristics of the substance chosen. It is usually preferable to use 5% to 15% by weight of adsorbent, based on the weight of MNPT. It is preferred that the commercially available adsorbent "Tonsil IFF" be utilized. Where "Tonsil IFF" is used, the preferred amount to be used is about 10 parts by weight of adsorbent for each 100 parts by weight of crude MNPT. "Tonsil IFF" is finely divided siliceous adsorbent having a bulk density of 420 grams per liter loose, or 630 grams per liter packed. The particle size is such that 0.5% is retained on 100 mesh screen (Standard Sieve Series), 7.0% is retained on 150 mesh screen, 17–20% is retained on 250 mesh screen and 80–83% pass a 250 mesh screen.

Another suitable adsorbent is Super Filtrol Grade 1 Adsorbent, a highly activated clay having a particle size such that 100% will pass through a 100 mesh screen, 85% will pass a 200 mesh screen and 70% will pass a 325 mesh screen, an apparent bulk density of 45 lb./cu. ft., a particle density of 1.3, a specific gravity of 2.65 after heating to 1000° F., free moisture 15.0%, free and combined moisture 21.0%, and surface area 275 square meters per gram. The chemical constituents are 70% $SiO_2$, 17.0% $Al_2O_3$, 3.9% $Fe_2O_3$, 3.2% $MgO$, 1.6% $CaO$, 1.8% $SO_3$, 1.0% $K_2O$ plus $Na_2O$ and 0.6% $TiO_2$.

Another suitable adsorbent is Celkate T–21, a calcium silicate having a density of 13.5 lb./cu. ft. and of a particle size such that 2.0% is held on a 325 mesh screen.

Where the MNPT melt is separated from the particulate solid adsorbent by filtration, a significant amount of pure MNPT remains occluded within the adsorbent filter press-cake. Some of this occluded MNPT can be recovered by first blowing out the filter and press-cake with pressurized gas, and then steam stripping the remaining press-cake. Steam stripping of the press-cake produces, as a condensate, a mixture of water and purified MNPT. Thus, the two step procedure of gas-blowing and then steam stripping recovers a substantial portion of the MNPT occluded in the filter and press-cake. Furthermore, the quality of the MNPT recovered from the adsorbent press-cake is sufficiently high so that it can be combined with the next crude feed.

The purified MNPT melt obtained after separation from the particulate solid adsorbent can be converted to solid form in any appropriate manner. Particularly useful solid MNPT is formed by cooling the liquid and permitting it to solidify. The MNPT is obtained by flaking the melt and grinding the flaked solid. Another preferred method of obtaining the MNPT in workable solid form involves spray chilling the purified liquid MNPT.

The following examples, in which the quantities are given in parts by weight unless otherwise indicated, are illustrative of the present invention. The examples are not exhaustive, and only purport to exhibit the best methods contemplated in the practice of the instant novel process.

EXAMPLE I 1000 grams of crude MNPT, produced by ammonolysis of MNPC, analyzing 2% MNPC, was charged into a tank. 30 grams of sodium hydroxide were dissolved in 1500 ml. of water (2% aqueous sodium hydroxide in two-fold excess of the quantity needed to be stoichiometrically equivalent to the MNPC present) were added to the crude MNPT, and the mixture heated to 125° C. and held there for 20 minutes. The mixture was then cooled, slowly, for two hours, with good agitation, to a temperature of about 90° C. The finely granulated solid MNPT was then separated by filtration, and was washed with cold water until the washings gave a pH of 7. The MNPT was then dried and weighed; the yield was 980 grams of MNPT (98% based on the original crude). Infrared analysis gave MNPC content of less than 0.1%.

The example is illustrative of the procedures herein disclosed, for pretreating the crude MNPT to remove unreacted MNPC starting material.

EXAMPLE II 700 grams of crude MNPC, obtained from the ammonolysis of MNPC, analyzing 1.5% MNPC and 0.81% residue, was charged into a receiver and 6 grams of sodium hydroxide, dissolved in 1400 ml. of water (0.04% aqueous sodium hydroxide), in two-fold excess of that needed to be stoichiometrically equivalent to the MNPC present were added. The mixture was stirred gently at 115° C. for ten minutes, and then allowed to settle for 30 minutes. The MNPT oil layer was drawn off from the lighter aqueous layer, and was blown through a valve into 440 grams of water in a second receiver. The boundary between the MNPT oil layer and the dilue caustic wash layer was only judged approximately, and the oil was partially soluble in the aqueous phase at the elevated temperatures utilized. The remaining aqueous caustic wash was retained in the first receiver.

The slurry formed in the second receiver was filtered, the filtrate being retained, and the solid MNPT washed with a small amount of water which was combined with the filtrate. The yield was 755 grams of wet crude MNPT, corresponding to 570 grams of dry MNPT.

A second 700 gram charge of crude MNPT was introduced into the receiver along with 3 grams of sodium hydroxide (to replenish that used in forming the sodium salt of the MNPC present in the original crude charge), and 360 grams of the above filtrate. The caustic washing procedure was then repeated in a precisely similar fashion to that outlined above. This cycle was repated five times. Table I gives the wet and dry weights for each run of the caustic washing series.

Table I

| Run | Weight Wet | Weight Dry |
| --- | --- | --- |
| 1 | 755 | 570 |
| 2 | 1,017 | 759 |
| 3 | 885 | 659 |
| 4 | 895 | 691 |
| 5 | 836 | 668 |
| Total | 4,388 | 3,347 |

The final dilute aqueous caustic wash liquor remaining in the receiver was blown through a valve into 500 ml. of water at 90° C., and the resulting slurry filtered, giving 38 grams of dry MNPT (corresponding to 53 grams of wet). Thus, the total recovery from the caustic washing treatment was 3347 g.+38 g.=3385 g. The 3385 grams of caustic washed crude represent a 96.7% recovery based on the 3500 grams of original crude. However, since 53 grams of MNPC were present in the original crude (1.5% of 3500 grams), the recovery based on original crude less MNPC content was $$3385 \text{ g.} \div (3500 \text{ grams} - 53 \text{ grams}) = \frac{3385}{3447} = 98.2\%$$

The caustic washed crudes were combined and divided into four portions of 846 grams each. Each was subjected to the same melt washing treatment: 846 grams of caustic washed crude was introduced into a receiver, and 1200 grams of water was added. The mixture was heated and held at about 120° C. for 10 minutes and was then allowed to settle at 120° C. for 30 minutes. The oil layer was separated and blown through a valve into 500 milliliters of water in a second receiver, with agitation. The slurry was filtered, washed with a little water, and dried. A second 846 gram charge of caustic washed crude was introduced into the receiver and was melt washed according to the same procedure. The cycle of operation was repeated in substantially the same manner for the other charges of caustic washed crude.

The final aqueous wash liquor remaining in the first receiver was blown through a valve into 500 milliliters of water at 90° C. with agitation, and the slurry was filtered, giving 47 grams (49 grams, wet) of MNPT.

The melt washed crude was heated to 125° C. in the receiver, with agitation, to flash off the water. The dry melt was then run into a stainless steel pan and allowed to crystallize.

Table II gives the wet and dry weights for each run of the melt wash series.

Table II

| Run | Wet Weight MNPT | Dry Weight MNPT |
| --- | --- | --- |
| 1 | 918 | 748 |
| 2 | 985 | 822 |
| 3 | 998 | 808 |
| 4 | 1,095 | 914 |
| Total | 3,996 | 3,292 |

The total recovery of melt washed MNPT is (3292+47)=3339 grams, representing 95.4% based on the original crude; 97.7% based on the original crude less MNPC content; and 98.5% based on the caustic washed crude. Infrared analysis of the dry melt washed crude gave an MNPC content of less than 0.1%.

The example is illustrative of another pretreatment for removal of MNPC. Furthermore, the example shows how the same caustic and aqueous washes can be utilized in treating successive charges of crude MNPT.

EXAMPLE III

The aqueous caustic washes and the aqueous washes from Example II were combined, and the resultant mixture was acidified with sulfuric acid to a pH of 1 to 2. Steam distillation of the mixture then yielded 33 grams of MNPC starting material. The recovery was, thus, 62.8% of the 53 grams present in the original crude (1.5% of 3500 grams).

This example illustrates how substantial amounts of unreacted starting material can be recovered from the crude MNPT and can be used again.

EXAMPLE IV 50 grams of crude MNPT, washed free of MNPC, were placed in a 250 milliliter vessel along with 5 grams of "Tonsil IFF," a particulate solid adsorbent. The vessel was placed inside an oven at 121° C., with occasional agitation for four hours. A sintered glass filter was given a one-fourth inch pre-coat of filter aid ("Celite" No. 545, diatomaceous silica, and "Fibraflo" No. 4C, asbestos.) After four hours, the molten MNPT adsorbent slurry was vacuum filtered yielding 29 grams of purified MNPT, with a melting point of 116.3 to 117.8° C.

EXAMPLE V 2000 grams of melt washed, MNPC free, crude MNPT, together with 200 grams of "Tonsil IFF," was introduced into a tank and the mixture was held at 125° C. for twenty minutes. The filter cartridge in a filter was pre-coated with 10 grams of filter aid ("Celite" No. 545 and "Fibraflo" No. 4C). The slurry was then filtered under 20 p.s.i. nitrogen pressure. The molten filtrate was allowed to crystallize in a stainless steel tray. The yield was 1425 grams of pure MNPT, which melted at 116.4 to 117.5° C. The setting point was 117° C. The initial recovery was 71.3% based on the melt washed crude.

Examples IV and V illustrate the novel melt-adsorption treatment utilized in the purification of MNPT by the method of the invention disclosed herein.

EXAMPLE VI

The filter in Example V was blown out with nitrogen, yielding an additional 195 grams of purified MNPT, or a total yield of 1620 grams, 81% based on the melt washed crude.

The cake remaining on the filter was then stripped with 130° C. steam, the condensate (a mixture of MNPT and water) being collected. The MNPT was filtered off and dried. The purified MNPT thus recovered was 343 grams. The total recovery of MNPT was, therefore (1620 grams+343 grams)=1963 grams, or 98.2% based on the melt washed crude.

The final dried cake on the filter weighed 277 grams, an analysed 13% MNPT. Further steam stripping would have recovered more of the occluded MNPT.

This example illustrates how occluded MNPT can be recovered from the filter and adsorbent so as to increase the percentage recovery for the melt adsorption process.

It will be recognized that changes and variations may be made without departing from the invention. It should be noted that the particle size distribution of filter aids is substantially different from the particle size distribution of the particulate adsorbents. In general, the filter aids have larger particle sizes than the adsorbents. For example, six filter aids described in Table II in Industrial and Engineering Chemistry, volume 44, page 405, April 1942, have the following particle size distribution:

| Mesh Size | Filter-Cel | Standard Super-Cel | Hyflo Super-Cel | Celite 503 | Celite 535 | Celite 545 |
|---|---|---|---|---|---|---|
| 40 | 2.5 | 4.5 | 6.0 | 12.0 | 17.5 | 24.0 |
| 40–20 | 8.0 | 10.0 | 15.5 | 25.5 | 32.0 | 52.0 |
| 20–10 | 14.0 | 20.0 | 33.5 | 29.0 | 32.0 | 18.5 |
| 10–6 | 19.0 | 24.5 | 22.0 | 19.5 | 16.0 | 4.5 |
| 6–2 | 37.5 | 33.5 | 21.5 | 13.5 | 2.5 | 1.0 |
| 2 | 19.0 | 7.5 | 1.5 | 0.5 | | |

On the other hand, the particulate adsorbents employed in the practice of the invention normally have a major percentage of the particles passing through a 250 mesh screeen. In most cases at least 80% of the particles of the particulate adsorbent will pass through a 250 mesh screeen. It is therefore desirable in using finely divided adsorbents to add a minor proportion of a filter aid, preferably about 2% by weight, in order to maintain the filtration rate. Otherwise, the adsorbents will tend to plug the filters. In most cases, plugging is prevented by coating the filter aids on the filter cartridge.

In an application of John Cryer and Paul R. Bobo, United States Serial No. 315,645, filed of even date herewith, a process for purifying meta nitro para toluidine is described in which an anhydrous meta nitro para toluidine melt is contacted with a particulate solid adsorbent for a time sufficient to allow substantial contact between said melt and said adsorbent, at a temperature in excess of the melting point of said meta nitro para toluidine but below the temperature at which substantial decomposition occurs, and thereafter separating said meta nitro para toluidine from said particulate solid adsorbent and recovering said meta nitro para toluidine. This process involves no pretreatment of the crude meta nitro para toluidine and in order to obtain the desired purification it is normally necessary to use several, preferably at least three, successive melt adsorption treatments. In the practice of the present invention by employing a preliminary treatment to remove meta nitro para cresol it becomes possible to carry out the purification process with only one melt adsorption treatment.

The present invention provides a novel process for the purification of MNPT produced by the ammonolysis of MNPC. Purified MNPT is obtainable in excellent yield at a great saving in cost, over prior methods of purification. Furthermore, starting material, present as an impurity, is recoverable and can be reutilized.

The invention is hereby claimed as follows:

1. A process for purifying crude meta nitro para toluidine obtained by the ammonolysis of meta nitro para cresol comprising
    (a) pretreating said meta nitro para toluidine in its liquid state with a dilute aqueous alkali solution containing an alkali from the class consisting of alkali metal carbonates and hydroxides for a period of time sufficient to remove a portion of the meta nitro para cresol present as an impurity; and separating the aqueous phase from the resultant meta nitro para toluidine;
    (b) thereafter contacting said meta nitro para toluidine in a liquid state with a particulate solid adsorbent having a particle size such that a major percentage of the particles will pass a 250 mesh screen for a time sufficient to permit adsorption of impurities from said meta nitro para toluidine by said adsorbent, at a temperature in excess of the melting point of said meta nitro para toluidine but below the temperature at which substantial decomposition of meta nitro para toluidine occurs, and
    (c) thereafter separating meta nitro para toluidine while in the molten state from said particulate solid adsorbent.

2. A process as claimed in claim 1 in which the liquid meta nitro para toluidine is maintained at a temperature of about 120° C. to 130° C. in step (b).

3. A process is claimed in claim 1 in which the meta nitro para toluidine is separated from the adsorbent in step (c) by filtration in its liquid state at a temperature of about 120° C. to 130° C.

4. A process as claimed in claim 1 in which the purified meta nitro para toluidine is filtered in the liquid state to separate the particulate adsorbent on a filter coated with a filter aid having a particle size of 2 to 40 mesh to improve the rate of filtration.

5. A process as claimed in claim 4 in which the filter and the filtered adsorbent are steamed to remove occluded meta nitro para toluidine which is recovered.

6. A process as claimed in claim 4 in which the filter and the filtered adsorbent are air blown and steam stripped to remove occluded meta nitro para toluidine which is recovered.

7. A process as claimed in claim 1 in which the purified meta nitro para toluidine is recovered by spray chilling.

8. A process as claimed in claim 1 in which the purified meta nitro para toluidine is recovered by flaking and grinding.

9. A process for purifying crude meta nitro para toluidine obtained by the ammonolyis of meta nitro para cresol comprising
    (a) pretreating said meta nitro para toluidine in the liquid phase, at a temperature in excess of the melting point of meta nitro para toluidine but not greater than about 150° C., with dilute aqueous alkali containing 0.04% of 2% alkali by weight, calculated as NaOH, with agitation, said-alkali being from the class consisting of alkali metal hydroxide and carbonate,
    (b) removing the aqueous phase,
    (c) thereafter drying said meta nitro para toluidine in its molten state by heating to a temperature in excess of the melting point thereof but not greater than about 150° C.,
    (d) thereafter contacting said meta nitro para toluidine with 5% to 15% by weight of a particulate solid adsorbent having a particle size such that a major percentage of the particles will pass a 250 mesh screen for 15 to 45 minutes, at a temperature in excess of the melting point of said meta nitro para toluidine but not greater than about 150° C., and
    (e) thereafter separating meta nitro para toluidine while in the molten state from said particulate solid adsorbent.

10. A process as claimed in claim 9 in which the molten phase containing meta nitro para toluidine is washed with water after step (b) and before step (c).

11. A process for purifying crude meta nitro para toluidine obtained by the ammonolyis of meta nitro para cresol comprising
    (a) pretreating said meta nitro para toluidine in the liquid phase at a temperature in excess of the melting point of meta nitro para toluidine but not greater than about 150° C., with aqueous 0.04% to 2% by weight, calculated as NaOH, alkali solution with agitation, said alkali being from the class consisting of alkali metal hydroxide and carbonate,
    (b) slowly cooling the resulting slurry to a point below the melting point of meta nitro para toluidine, separating the granular solids of meta nitro para toluidine from the mother liquor, washing the solids with water,
    (c) thereafter drying and melting said meta nitro para toluidine by heating to a temperature in excess of the melting point thereof but not greater than about 150° C.,
    (d) thereafter contacting said meta nitro para toluidine with a particulate solid adsorbent having a particle size such that a major percentage of the particles will pass a 250 mesh screen for a time sufficient to permit adsorption of impurities from said meta nitro para toluidine by said adsorbent, at a temperature in excess of the melting point of said meta nitro para toluidine but not greater than about 150° C., and (e) thereafter separating meta nitro para toluidine while in the molten state from said particulate solid adsorbent.

12. A process for purifying crude meta nitro para toluidine obtained by the ammonolyis of meta nitro para cresol comprising (a) subjecting said meta nitro para toluidine to at least one dilute aqueous 0.04% to 2% by weight sodium hydroxide wash followed by at least one aqueous wash at a temperature in excess of the melting point of meta nitro para toluidine, but below the temperature at which substantial decomposition occurs, with agitations, (b) separating the aqueous phase, (c) thereafter drying said meta nitro para toluidine in its liquid state by heating to a temperature in excess of the melting point thereof but not greater than the temperature at which substantial decomposition occurs, (d) thereafter contacting said meta nitro para toluidine with a particulate solid adsorbent having a particle size such that a major percentage of the particles will pass a 250 mesh screen for a time sufficient to permit adsorption of impurities from said meta nitro para toluidine by said adsorbent, at a temperature in excess of the melting point of meta nitro para toluidine but below the temperature at which substantial decomposition occurs, and (e) thereafter separating said meta nitro para toluidine while in its liquid state from said particulate solid adsorbent.

13. A process for purifying crude meta nitro para toluidine obtained by the ammonolysis of meta nitro para cresol comprising (a) pretreating said meta nitro para toluidine in the liquid phase, at a temperature in excess of the melting point thereof but not greater than about 150° C., with dilute aqueous 0.04% to 2% by weight sodium hydroxide, under conditions of mixing, (b) thereafter subjecting said meta nitro para toluidine to a series of aqueous washes at a temperature in excess of the melting point of said meta nitro para toluidine but not greater than about 150° C., under conditions of mixing, (c) thereafter drying said meta nitro para toluidine by heating to a temperature in excess of the melting point thereof but not greater than about 150° C., (d) thereafter contacting said meta nitro para toluidine with a particulate solid adsorbent having a particle size such that a major percentage of the particles will pass a 250 mesh screen for 15 to 45 minutes, at a temperature in excess of the melting point of meta nitro para toluidine but not greater than about 150° C., and (e) thereafter separating said meta nitro para toluidine in its liquid state from said particulate solid adsorbent.

14. The process of claim 13 wherein said meta nitro para toluidine is pretreated with dilute aqueous sodium hydroxide at a temperature in excess of about 120° C. but less than about 130° C., and wherein said meta nitro para toluidine is subjected to a series of aqueous washes at a temperature in excess of about 120° C. but less than about 130° C.

References Cited by the Examiner

UNITED STATES PATENTS

| | | | |
|---|---|---|---|
| 2,365,493 | 12/1944 | Richardson | 260—582 |
| 2,623,903 | 12/1952 | Weaver et al. | 260—582 |
| 2,950,319 | 8/1960 | Schenck et al. | 260—582 |
| 3,069,470 | 12/1962 | Fleck et al. | 260—582 |

FOREIGN PATENTS 1,128,430   4/1962   Germany.

CHARLES B. PARKER, *Primary Examiner.*

JOSEPH P. BRUST, *Examiner.*

D. R. MAHANAND, D. M. PAPUGA,
    *Assistant Examiners.*